US008840078B2

(12) United States Patent
DeWald (10) Patent No.: US 8,840,078 B2
(45) Date of Patent: Sep. 23, 2014

(54) PORTABLE BEVERAGE HOLDER

(71) Applicant: Chris DeWald, Milwaukie, OR (US)

(72) Inventor: Chris DeWald, Milwaukie, OR (US)

(\*) Notice: Subject to any disclaimer, the term of this patent is extended or adjusted under 35 U.S.C. 154(b) by 0 days.

(21) Appl. No.: 13/752,827

(22) Filed: Jan. 29, 2013

(65) Prior Publication Data

US 2014/0209769 A1     Jul. 31, 2014

(51) Int. Cl.
| | |
|---|---|
| *A47G 19/06* | (2006.01) |
| *A47G 19/22* | (2006.01) |
| *A47G 23/02* | (2006.01) |
| *F16M 13/02* | (2006.01) |
| *B60N 3/10* | (2006.01) |

(52) U.S. Cl.
CPC ............. *A47G 23/02* (2013.01); *F16M 13/02* (2013.01); *B60N 3/10* (2013.01)
USPC ........ 248/311.2; 248/312; 220/574; 220/737; 220/23.2

(58) Field of Classification Search
USPC ........... 248/311.2, 312, 312.1, 316.7, 346.04, 248/346.11; 206/289, 293, 426, 427, 428, 206/562, 156; 220/574, 737, 23.4, 23.86, 220/23.87
See application file for complete search history.

(56) References Cited

U.S. PATENT DOCUMENTS

| | | | | | |
|---|---|---|---|---|---|
| 2,602,310 | A | * | 7/1952 | Hansen | 206/426 |
| 4,860,895 | A | * | 8/1989 | Iaslovits | 206/426 |
| 5,297,767 | A | * | 3/1994 | Miller et al. | 248/311.2 |
| 6,059,138 | A | * | 5/2000 | Labruyere | 220/574 |
| 6,279,741 | B1 | * | 8/2001 | Arvin | 206/349 |
| 7,284,737 | B2 | * | 10/2007 | Kane | 248/311.2 |
| 8,132,770 | B2 | * | 3/2012 | Nargi | 248/311.2 |
| 2007/0144935 | A1 | * | 6/2007 | Davis et al. | 206/562 |

\* cited by examiner

*Primary Examiner* — Tan Le
(74) *Attorney, Agent, or Firm* — Baumgartner Patent Law; Marc Baumgartner (57) ABSTRACT

A portable beverage holder having a middle piece and a bottom piece operably coupled to each other, and wherein the middle piece includes a frontal opening sufficient for receiving the stem of a stemmed container, and wherein the bottom piece includes a frontal opening sufficient for receiving the foot of a stemmed container, and wherein the bottom side of the middle piece includes one or more downward projecting flaps sufficient to secure the foot of a stemmed container against the bottom piece. The beverage holder optionally can include a top piece operably coupled to the middle piece, also having a frontal opening sufficient for receiving the stem of a stemmed container. The beverage holder can also include a non-continuous upwardly extending wall near the perimeter of the holder for containing almost any type of beverage container.

17 Claims, 14 Drawing Sheets

PORTABLE BEVERAGE HOLDER

FIELD OF THE INVENTION

The present invention is in the field of portable holders for beverage containers.

BACKGROUND OF THE DISCLOSURE

People have demonstrated the desire to consume wine and other alcoholic and non-alcoholic beverages, contained within glasses, stemmed wine glasses, bottles, cans, cups, mugs, and the like, in remote locations including concerts, sporting events, the beach, campgrounds, and other events held away from their homes. Consequently, various devices have been proposed for holding such beverages in a secure manner so as to avoid spillage in these locations. There is, however, a continuing need for improved devices adapted for these purposes, which the following invention addresses.

SUMMARY OF THE INVENTION

The disclosure provides new and improved portable devices for holding a beverage container. According to certain embodiments, the non-walled portable beverage holders provided herein can hold a stemmed wine glass, while the walled portable beverage containers can hold virtually any type of beverage container such as glasses, stemmed wine glasses, bottles, cans, cups, mugs, and the like. Both types of holders can include releasable attachment means to couple to various supports and surfaces such as chair arms and frames, the ground, and sand, using straps, VELCRO® or other hook-and-loop fasteners, clamps, stakes, and the like.

Accordingly, in one embodiment the disclosure provides a portable beverage holder having a middle piece and a bottom piece, wherein the middle piece and bottom piece are fixably attached, wherein the middle piece includes a frontal opening sufficient for receiving the stem of a stemmed container, and wherein the bottom piece includes a frontal opening sufficient for receiving the foot of a stemmed beverage container, and wherein the bottom side of the middle piece includes one or more downward projecting flaps sufficient to secure the foot of a stemmed container against the top of the bottom piece. The portable beverage holder can optionally include a top having a frontal opening sufficient for receiving the stem of a stemmed container, wherein the top is releasably attachable to the topside of the middle piece. Accordingly to the walled holder embodiments, the middles piece can include an upwardly projecting wall useful in partially encompassing a bottle, can, or mug, and the like, to prevent the container from tipping over.

DETAILED DESCRIPTION OF THE EMBODIMENTS

Embodiments of the present invention are described below. It is, however, expressly noted that the present invention is not limited to these embodiments, but rather the intention is that modifications that are apparent to the person skilled in the art and equivalents thereof are also included.

Figure 1:
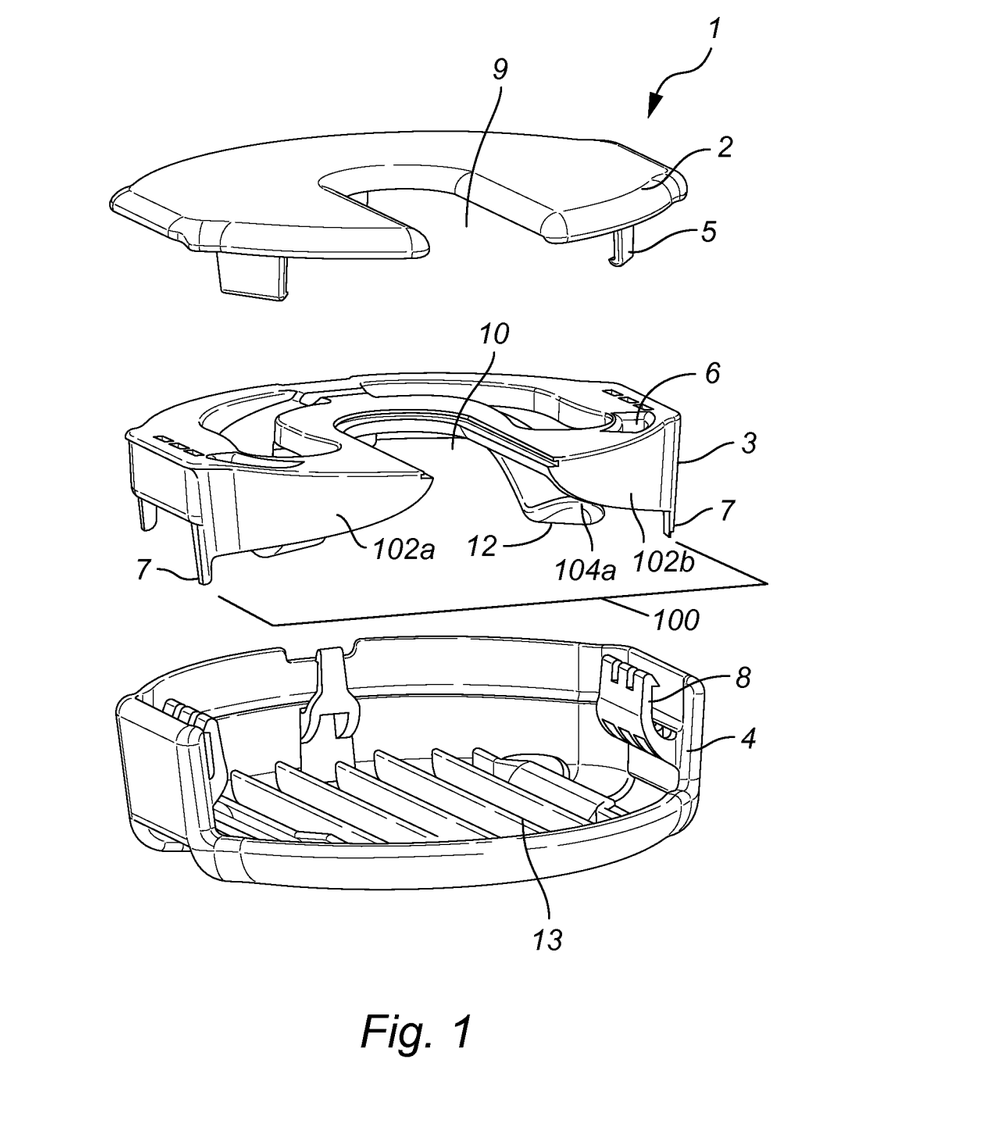
FIG. 1 illustrates a non-walled portable beverage holder in an exploded downward view.
Figure 2:
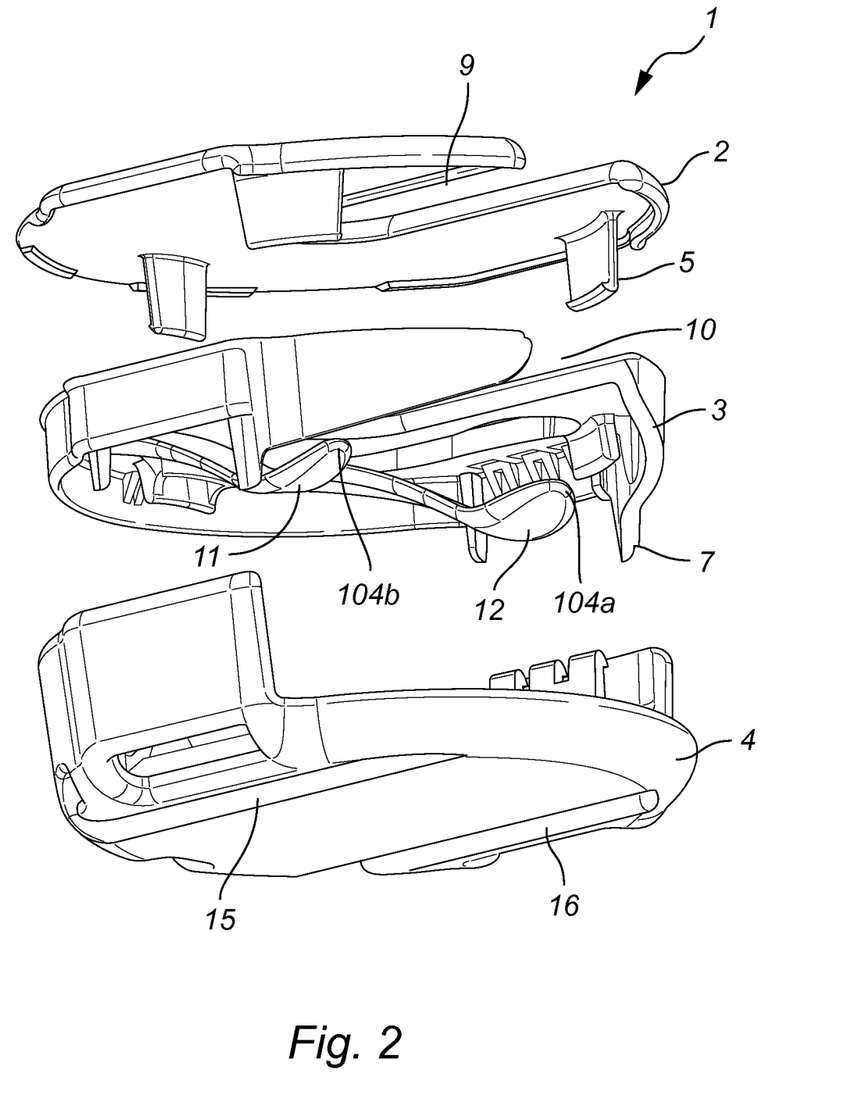
FIG. 2 illustrates a non-walled portable beverage holder in an exploded upward view.
Figure 3:
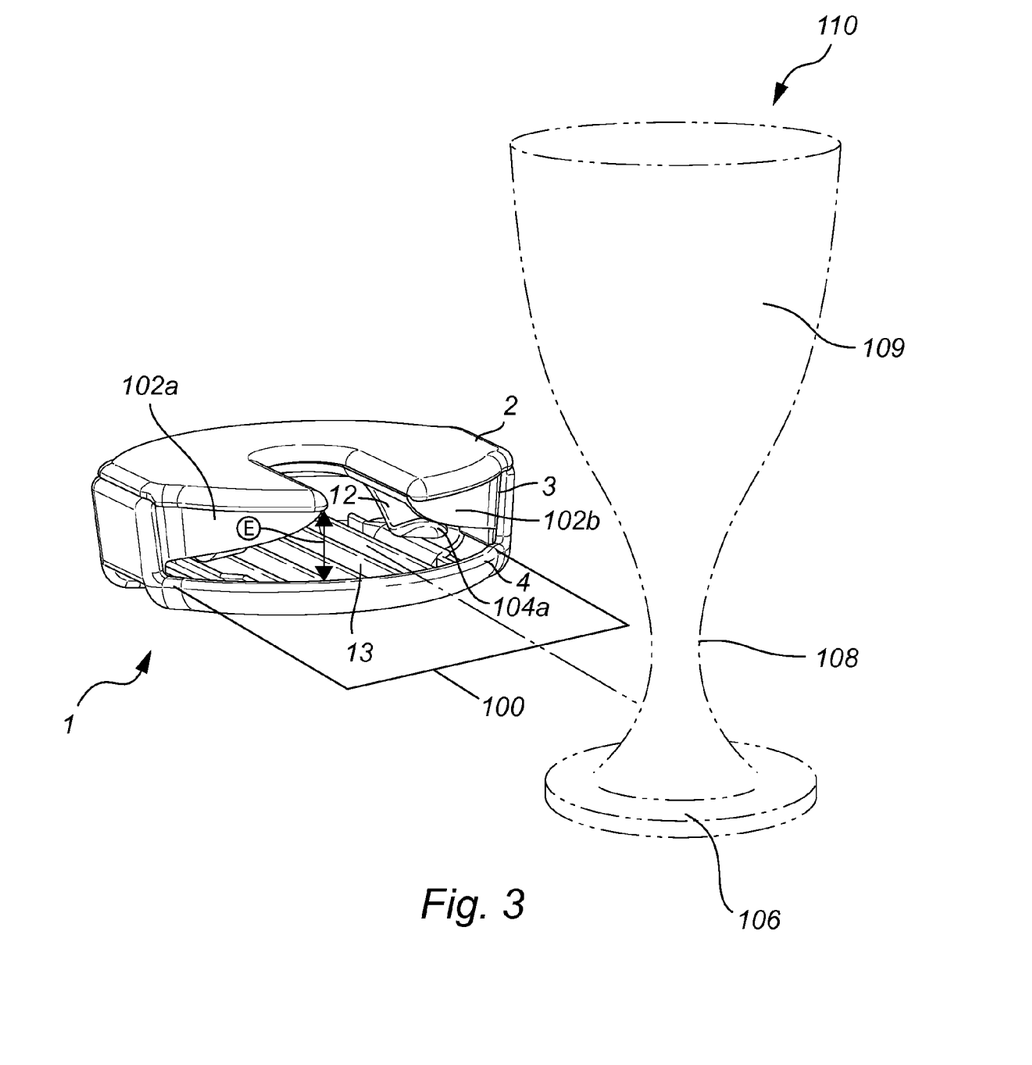
FIG. 3 illustrates a non-walled portable beverage holder assembled and a stemmed glass in a downward view.

FIG. 1 illustrates an embodiment of the invention of a non-walled portable beverage holder 1 in an exploded downward view. FIG. 2 illustrates an embodiment of the invention of a non-walled portable beverage holder 1 in an exploded upward view. FIG. 3 illustrates an embodiment of the invention of a non-walled assembled portable beverage holder 1 in downward view. The beverage holder 1 can include a middle piece 3 and a bottom piece 4, each of which are non-releasably coupled together to form a single unit. According to optional embodiments, a top piece 2 is configured to be releasably attachable to the middle piece 3, while the middle piece 3 and bottom piece 4 are non-releasably attached together, such as through molding or fusion. Thus, the middle piece 3 and bottom piece 4 non-releasably coupled to each other, and without the top piece 2, can function as a beverage holder by itself as a single unit. According to other embodiments, the top piece 2 is non-releasably attached to the top of the middle piece 3. FIGS. 1-6, and 9-14 depict a non-walled embodiment of the invention, and are useful in holding stemware, as opposed to cups, mugs, or bottles.

In one embodiment, the top piece 2 and middle piece 3 can include complementary means for releasably attaching to each other using a series of downwardly projecting tabs 5 present on the bottom side of top piece 2 for inserting into slots 6 present on the topside of the middle piece 3. The middle piece 3 and bottom piece 4 can be molded separately then non-releasably coupled together using molding or fusion and a series of tabs 7 present on the bottom side of the middle piece 3 for inserting into slots 8 present along the walls of the topside of the bottom piece 4. It is noted that in other alternative embodiments, tabs 5 and slots 6 may be present on the topside of the middle piece 3 and the bottom side of the top piece 2, respectively; and/or tabs 7 and slots 8 may be present along the walls of the topside of the bottom piece 4 and the bottom side of the middle piece 3, respectively.

According to certain embodiments, the middle piece 3 preferably includes two front panels 102a and 102b of substantially the same size and shape that taper upwards, and towards each other to define a narrow upper opening 10 and a larger bottom opening 100. The panels 102a and 102b thus taper upward like the foot 106 of most stemware tapers upward to the stem 108. The upper opening 10 is configured to receive and contain the stem 108 of a stemmed container 110, such as a wine glass. Non-exclusive examples of suitable stemware the holder 1 can secure include brandy snifters, cordial glasses, chalices and goblets, cocktail glasses, margarita glasses, champagne flutes, and wine glasses. Preferred widths of the upper opening 10 can include about 0.8 inches, or between about 0.5-1.25 inches. The upper opening 10 may be in any suitable shape including an elongated semi-circular shape or an elongated oval shape, as well as a square or rectangular cut-out shape. Similarly, the top piece 2 of the beverage holder 1 can include an opening 9 that is the same size and shape of the upper opening 10 of the middle piece 3, or substantially so, such that opening 9 and the upper opening 10 are vertically aligned when the top piece 2 is releasably secured to the middle piece 3. Preferred widths of opening 9 are about 0.8 inches, or between about 0.5-1.25 inches.

The width of the larger bottom opening 100 is configured to receive a foot 106 of most stemware, and can be defined between the downwardly projecting tabs 7 of the middle piece 3, or by other corresponding pieces. The height E of the bottom opening 100 can be defined by the highest point of the undersides of the front panels 102a and 102b (or corresponding lower section of the wall 17) and the bottom piece 4, such as the topside or rim of the bottom piece 4. Preferred heights E can be about 0.625 inches, or between about 0.5 to 1 inches. The largest width of the bottom opening 100 is configured to receive the foot 106 of most conventionally sized stemware 110, as described above. As the foot 106 of stemware 110 typically flanges outward from the bottom of the stem 108, the foot 106 typically has a larger diameter than the stem 108. Preferred widths of the bottom opening 100 are about 3.3 inches or between about 2.5-3.75 inches, and are preferably less than 4 inches to accommodate most stemmed feet 106, which tend to be circular in shape.

The bottom side of the middle piece 3 may also include one or more flaps 11 and 12, which are attached to the bottom side of the middle piece 3 on either side of the upper opening 10 and extend downwards. In one embodiment, flaps 11 and 12 may be present for receiving and/or securing a stemmed foot 106 against the bottom piece 4. Thus, flaps 11 and 12 of the middle piece 3 act to trap the foot 106 of the stemmed container 110 by applying downward pressure on the foot 106 against the topside of the bottom piece 4. Preferably the flaps 11 and 12 are parallel to each other and straddle the upper opening 10. Additionally the flaps 11 and 12 preferably are springs that can flex upwards when the foot 106 of the stemware 110 is slid into the holder 1. According to specific embodiments, the bottom sides of the flaps 11 and 12 are positioned very close to the topside of the bottom piece 4 in their natural position, and have upwardly extending distal tips 104a and 104b, like snow skis. According to these embodiments, when the foot 106 of the stemware 110 is slid into the bottom opening 100, it engages the underside of the tips 104a and 104b, flexing the flaps 11 and 12 upwards to allow the foot 106 to slide underneath. The resilient flaps 11 and 12 thus press downward on the foot 106 of the stemware securing it against the top of the bottom piece 4.

The bottom piece 4 can include a series of ridges and grooves 13, which are present on the topside for additionally securing the foot 106 of the stemmed container 110 against the downward pointing flaps 11 and 12 of the middle piece 3. The bottom side of the bottom piece 4 can be configured to rest on a flat surface and support a full stemmed container 110. Additionally, the bottom piece 4 can include means for releasably attaching to a clamp, stake, strap base, or other support pieces, wherein said means can be positioned on the underside of the bottom piece 4 or elsewhere, such as the side. Preferably the means for releasably attaching to support means on the underside of the bottom piece 4 are recessed slots 15 and 16, instead of protruding tongues or tabs to more easily allow the underside of the bottom piece 4 to support the holder 1 on a substantially planar surface having a surface area of at least about the surface area of the bottom side of the bottom piece 4. In addition, one or more holes or slots may be present in the bottom 4 piece for attaching a strap or other suitable means for securing the beverage holder 1 to a base support, for example, a chair, a table, or any other suitable object in which a strap can encircle for the support and stability of the beverage holder 1.

Figure 15:
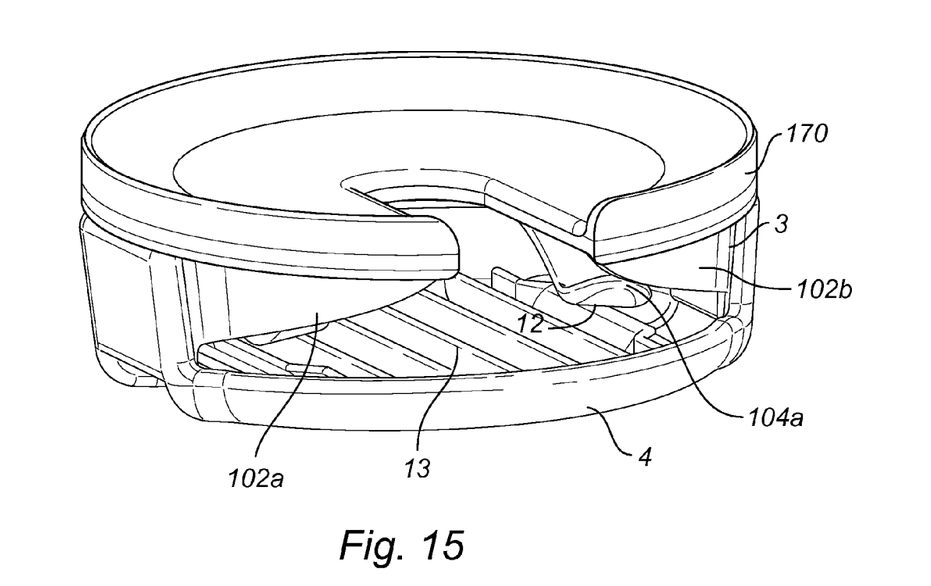
FIG. 15 illustrates a perspective view of a portable beverage holder for holding stemmed and stemless glasses.

The beverage holder 1 including the top piece 2, middle piece 3 and bottom piece 4, as well as tabs 5 and 7, slots 6 and 8, flaps 11 and 12 and ridges and grooves 13, in addition to support means such as clamps, stakes, and strap bases, can be made of any suitable materials including plastic materials covering a wide range of synthetic or semi-synthetic moldable, organic polymers as well as any suitable metal, metal-alloy, glass, fiberglass, wood or paper product. Preferably all parts of the holder 1 are made of the same material. In addition, the beverage holder 1 may include various dyes and/or other additives for coloring and other aesthetic purposes. The top piece 2 of the beverage holder 1 may include various decorative items including winery logos, sports team logos, or any decorative design desired. In addition, the top piece 2 may be smooth, flat, or textured depending upon the preferences of the user. According to further embodiments, and as shown in FIG. 15, the top piece 2 can include an outer rim 170, that extends upwards a short distance, such as under an inch, to help prevent a stemless beverage container, such as a stemless wine glass, placed on top of the beverage holder 1 from falling over. Thus the embodiment in FIG. 15 allows a user to stabilize either stemmed or stemless wine glasses.

Figure 4:
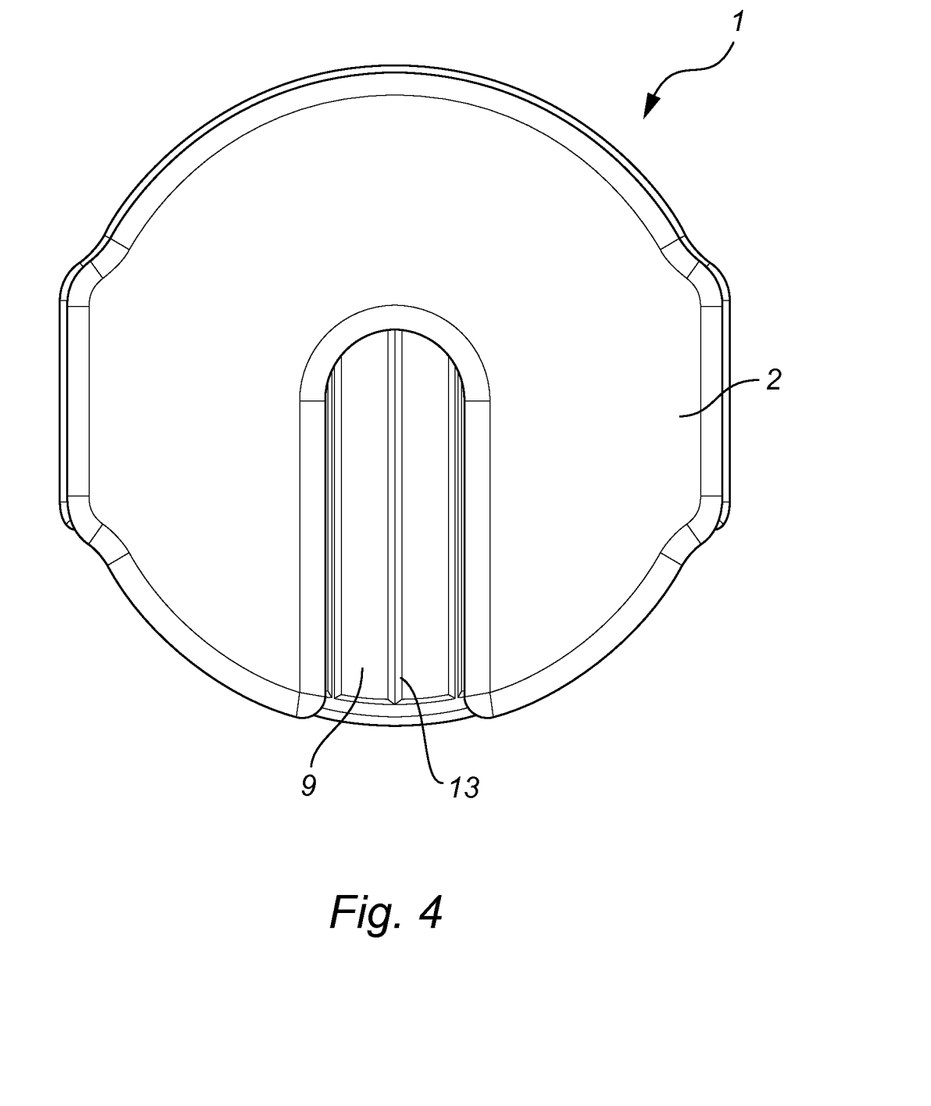
FIG. 4 illustrates a non-walled portable beverage holder in a top view.
Figure 5:
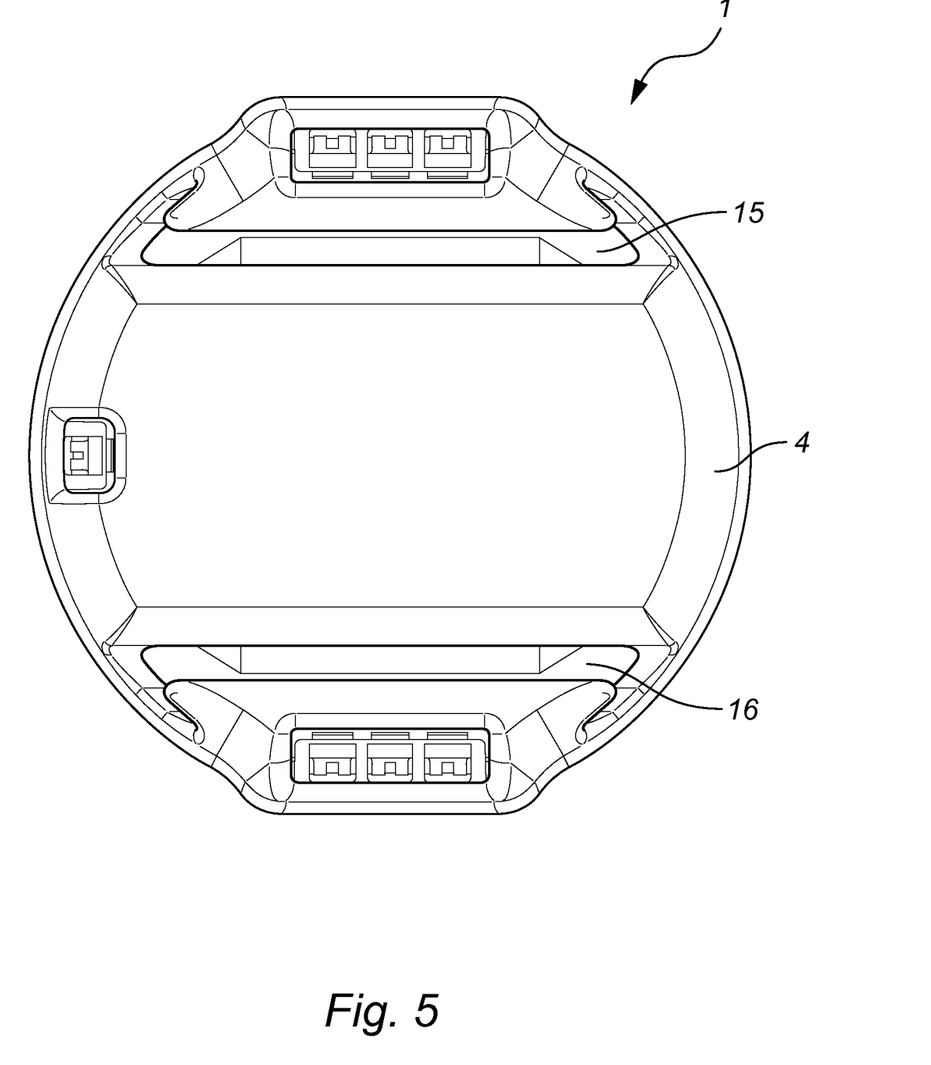
FIG. 5 illustrates a non-walled portable beverage holder in a bottom view.

As shown in FIG. 3, the bottom opening 100 is configured to receive the foot 106 of stemware 110 that tapers upward into the stem 108 which can be received in the combined upper hole defined by 9 and 10. A stemmed glass 110 is provided to show how the holder 1 will secure it. The foot 106 is inserted in the bottom opening 100 and the stem 108 is received in the upper holes 9 and 10. FIG. 4 illustrates a top view of the non-walled assembled portable beverage holder 1. As it is preferred that the middle piece 3 and top piece 2 are generally circular (to receive a circular foot 106 of a stemmed glass 110), their respective upper holes 10 and 9 define a substantially horseshoe shape as shown in this top view. FIG. 5 illustrates a bottom view of the non-walled assembled portable beverage holder 1. The bottom piece 4 may include one or more holes or slots for attaching a strap or handle or other suitable means for securing the beverage holder 1 to another surface or object, such as a chair. Also shown are two parallel, recessed slots 15 and 16, which may be releasably coupled with two complementary parallel tongues 23 and 24 present on the topside of a support, such as a stake, strap base, or clamp, for securing the beverage holder 1 as will be discussed in more detail below.

Figure 7:
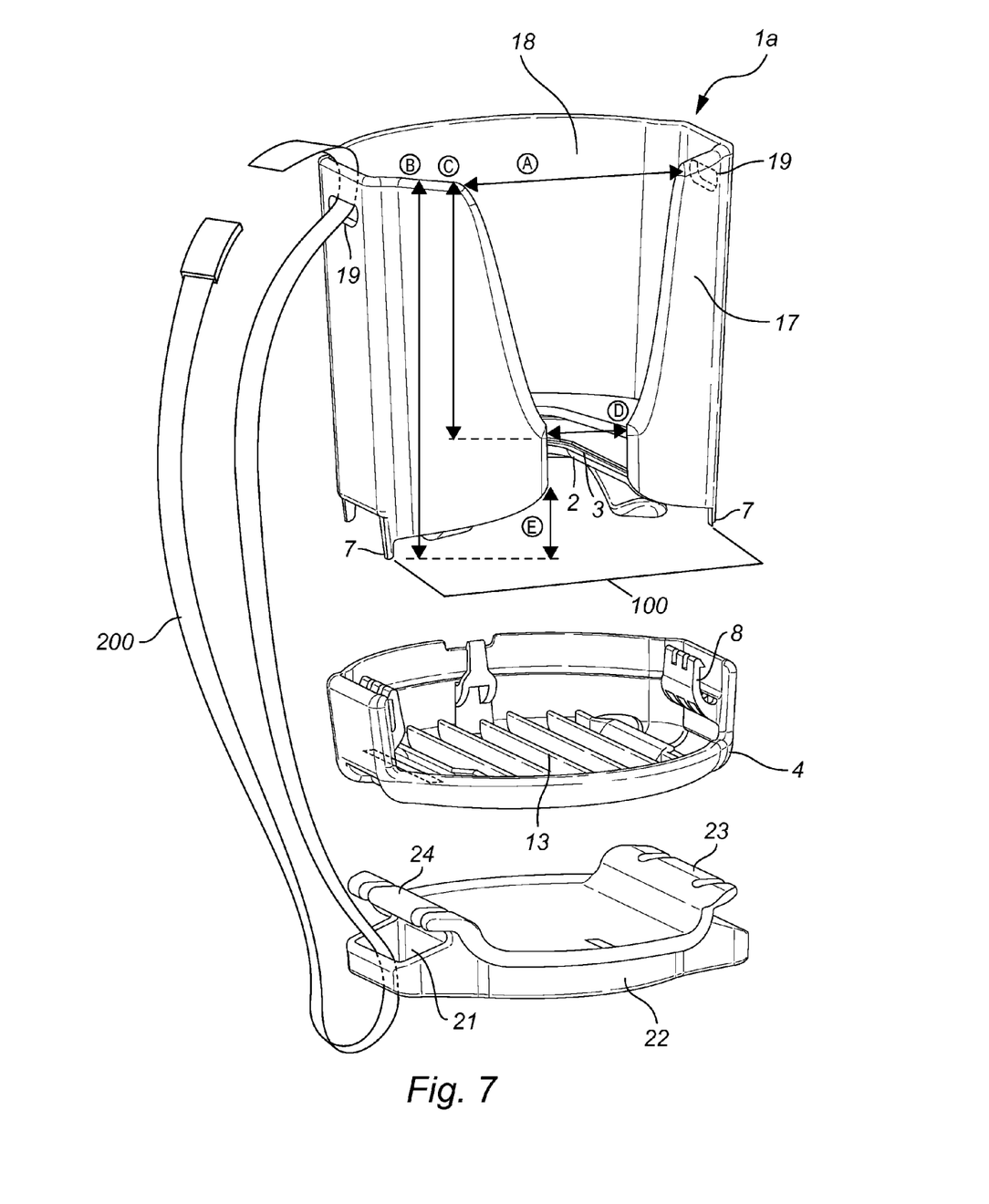
FIG. 7 illustrates a walled portable beverage holder in an exploded view.
Figure 8:
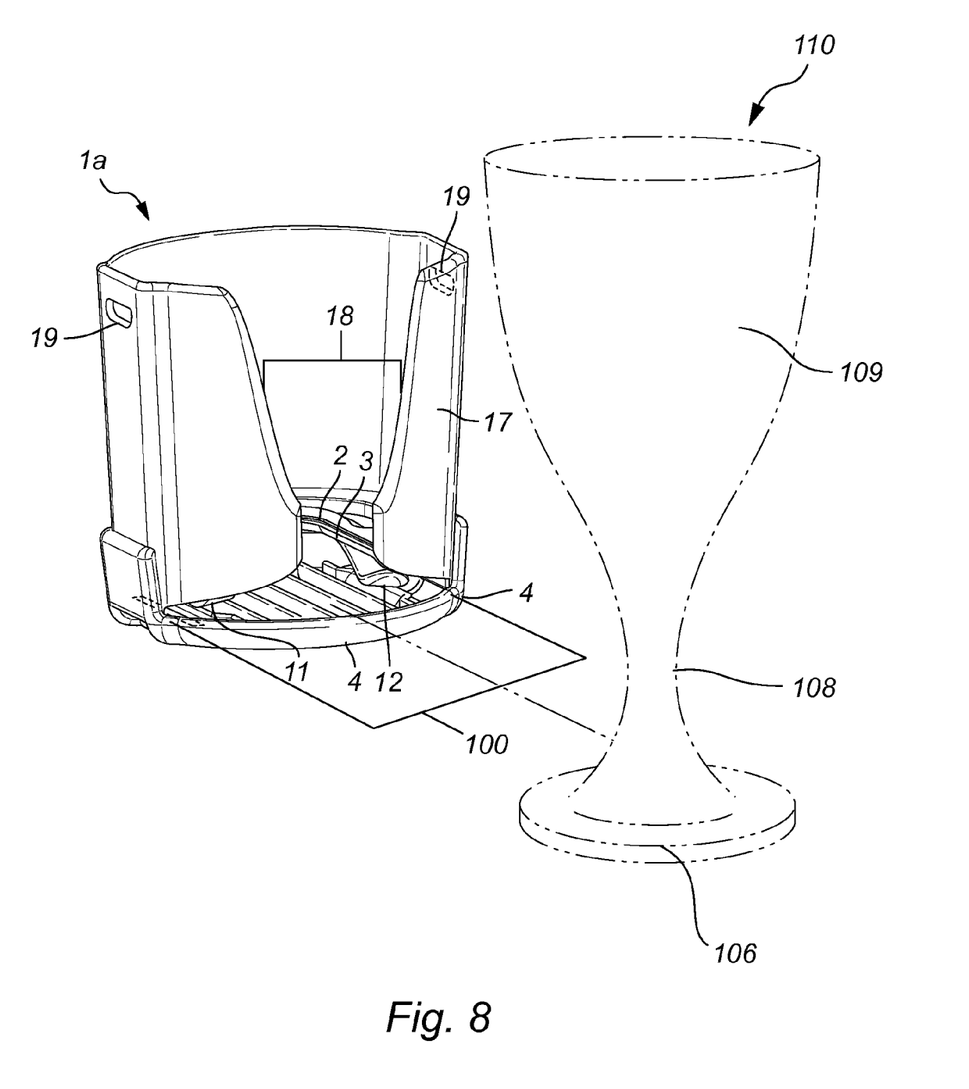
FIG. 8 illustrates a walled portable beverage holder assembled in a perspective view.

FIG. 7 illustrates a walled embodiment of the invention of a portable beverage holder 1a in an exploded view and FIG. 8 shows an assembled walled portable beverage holder 1a next to a stemmed glass 110. According to preferred embodiments, the walled beverage holder 1a includes a middle piece 3 and a bottom piece 4, but preferably lacks a top piece 2. According to other embodiments, not shown, a top piece 2 could be used. Unlike the non-walled holder 1 which is configured to hold stemware, the walled beverage holder 1a includes an upwardly projecting wall 17 along the perimeter or substantially close to the perimeter, which allows this embodiment to not only hold stemware but also cans, bottles, party cups, mugs, and virtually any other type of drinking vessel. The wall 17 is preferably not continuous and includes a front vertical gap 18 which allows for the entry of a stem 108 on a stemmed container 110, such as a wine glass, or a handle of a beer or coffee mug, for example. The vertical gap 18 is preferably aligned with the upper opening 10 of the middle piece, which is also configured to receive a stem. The vertical gap 18 preferably widens from the bottom to the top to accommodate the bowl 109 of the stemware 110. The lower, narrower section of the vertical gap 18 is useful in retaining narrower containers such as energy drink cans, beer bottles, or plastic drink bottles. To prevent these narrower beverage containers from falling out and allow the insertion and removal of a stem 108 or mug handle, there can be at least a lower section D having a width of about 0.8 inches, or between about 0.5-1.25 inches positioned at the bottom of the vertical gap 18. To prevent wider containers, such as party cups from falling out, an upper section A having a width of about 1.75 inches, or between about 1.25-2.25 inches can be positioned at the top of the vertical gap 18. Preferably no section of the vertical gap 18 is greater than 4 inches.

The wall 17 may be reversibly attached or permanently affixed to the middle piece 3, bottom piece 4, or top piece 2, if used. The wall 17 may be of any suitable height to secure the types of beverage containers described herein. The total height B of the walled beverage container 1a is preferably about 3.5 inches, or about 2 to 4.5 inches, or less than 6 inches. Additionally, the height C the wall 17 that extends upwards from the topside of the middle piece 3 is preferably 2.5 inches, or between 1.5 to 3.5 inches high. The vertical gap 18 in the wall 17 may be of any shape and size, including an elongated tapering shape or a slot-like shape for receiving a stemmed container. The wall 17 may also include one or more upper side holes or slots 19 for threading a strap 200 or other type of releasable securing means, to one or more holes or slots 21 of a strap base 22 or bottom piece 4. Alternatively, similar slots can be positioned on the lower wall or the middle piece 3 instead of the bottom piece 4. The threaded strap 200 can include releasable fasteners such as hook and loop (e.g., VELCRO®) or snaps, buttons, buckles, and the like to secure to itself around the support structure, such as a rail, or chair arm or frame. According to this embodiment, the side of the wall 17 and bottom piece 4 will thus abut against the lateral side of the support structure and the strap 200, which is threaded through slots 19 and 21 of the strap base 22 and then wrapped around the support structure and secured to itself using a releasable fastener such as those discussed above. It is also readily contemplated herein that one can utilize the walled beverage holder described herein without the middle and/or bottom pieces, and just an ordinary bottom, such that it is configured to hold almost any type of beverage container, except stemmed containers.

Figure 9:
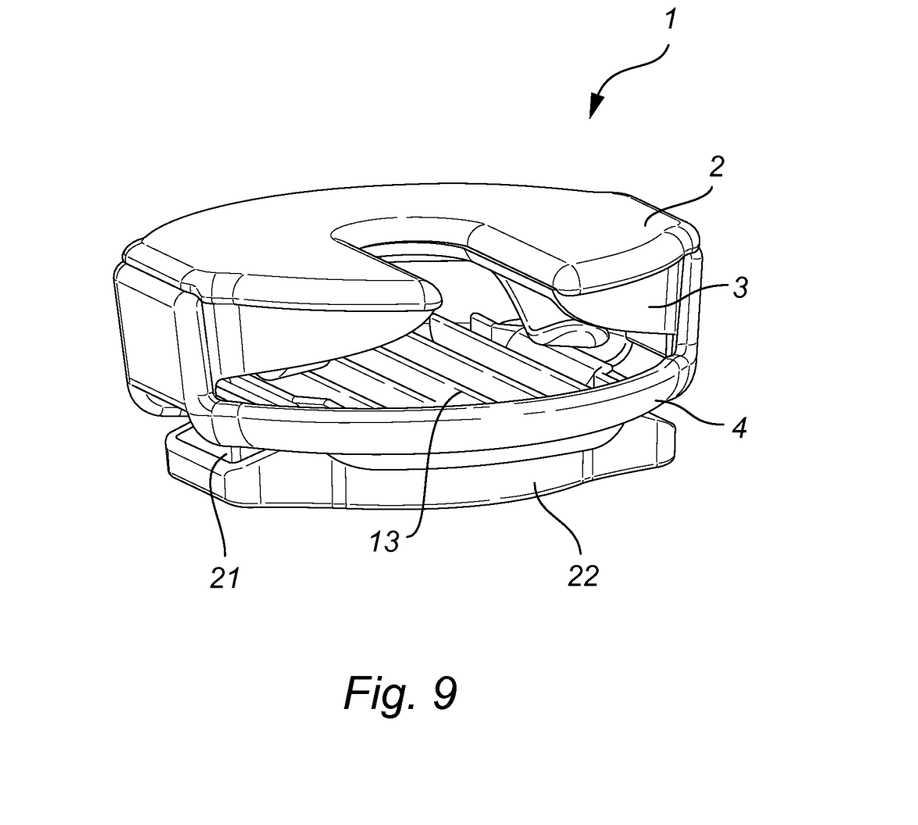
FIG. 9 illustrates a non-walled portable beverage holder assembled on top of a strap base in a perspective view.
Figure 10:
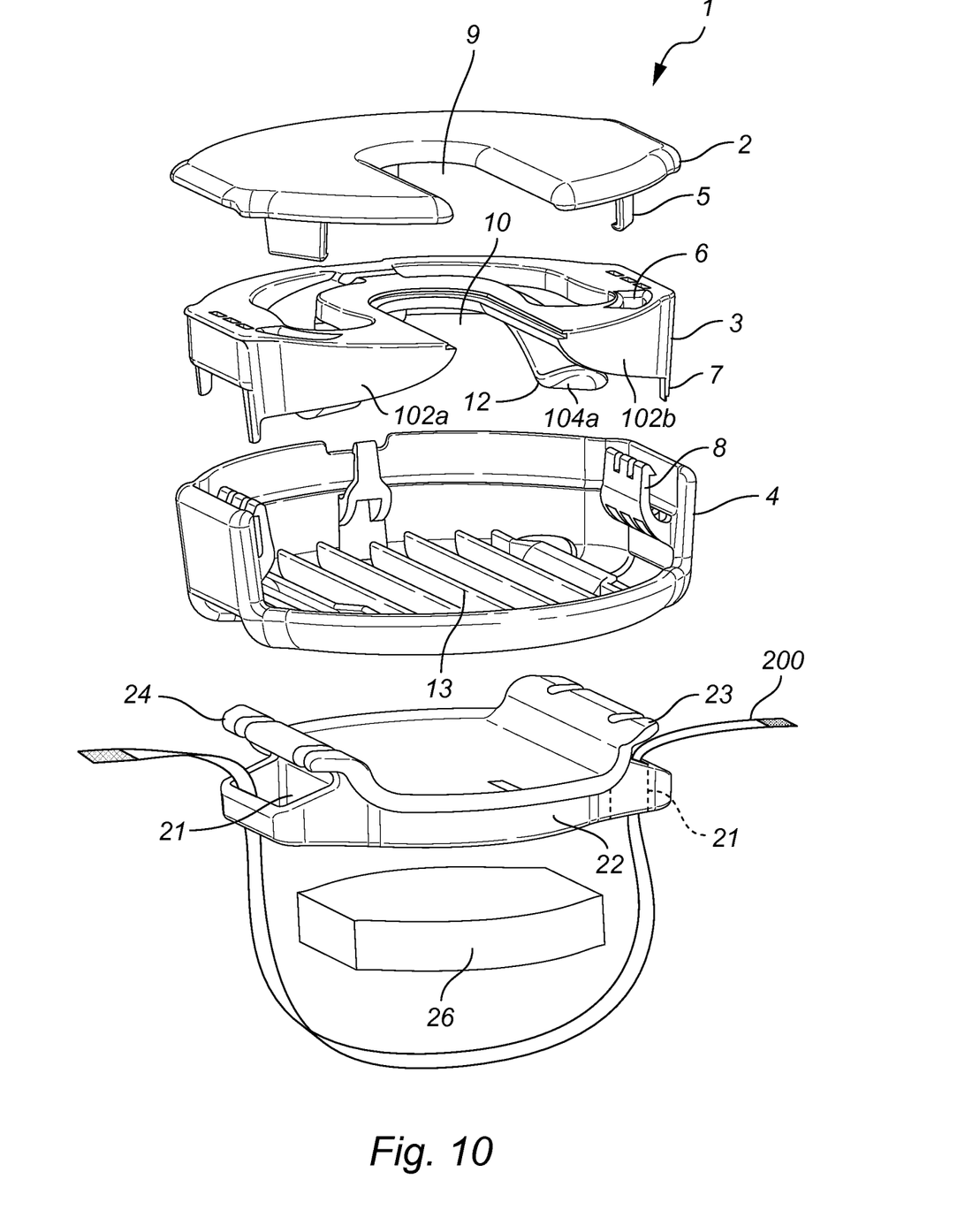
FIG. 10 illustrates a non-walled portable beverage holder and a strap base in an exploded view.

FIGS. 9 and 10 illustrate a non-walled portable beverage holder 1 with a strap base 22, providing assembled and exploded views respectively. As previously described, the beverage holder 1 includes a top piece 2, a middle piece 3, and a bottom piece 4. On the bottom side of the bottom piece 4 are two parallel grooves 15 and 16 that may be releasably coupled with two parallel tongues 23 and 24 that are present on the topside of a strap base 22, for weighted stability on a substantially planar surface, such as a table top, for example. Other releasable means of attachment between the strap base 22 and the bottom piece 4 can also be used. As an alternative embodiment, the bottom piece 4 can have two parallel tongues that are configured to be releasably coupled with two parallel grooves on the topside of the strap base 22 or other support (not shown). It is preferred that the underside of the strap base 22 is substantially level, and may be smooth or textured to prevent the strap base 22 and attached holder 1 from skidding or being tipped over on the surface it is placed atop. The strap base 22 can also be used with walled beverage holders 1a as well, see FIG. 7. The strap base 22 may also include one or more slots or holes 21 for attaching a strap 200 or other suitable means for securing the beverage holder 1 to a base support, for example, a chair, a table, or any other suitable object on which the strap can encircle for supporting and stabilizing the beverage holder 1. Further, the slots or holes 21 in the strap base 22 may be used for threading a securing strap 200 to the one or more holes or slots 19 of the wall 17. The strap base 22 can optionally be weighted with one or more inserts for weighted stability in stabilizing the beverage holder 1 or 1a. The strap base can optionally include a non-skid underside 26 which can be made of any suitable material such as rubber.

Figure 6:
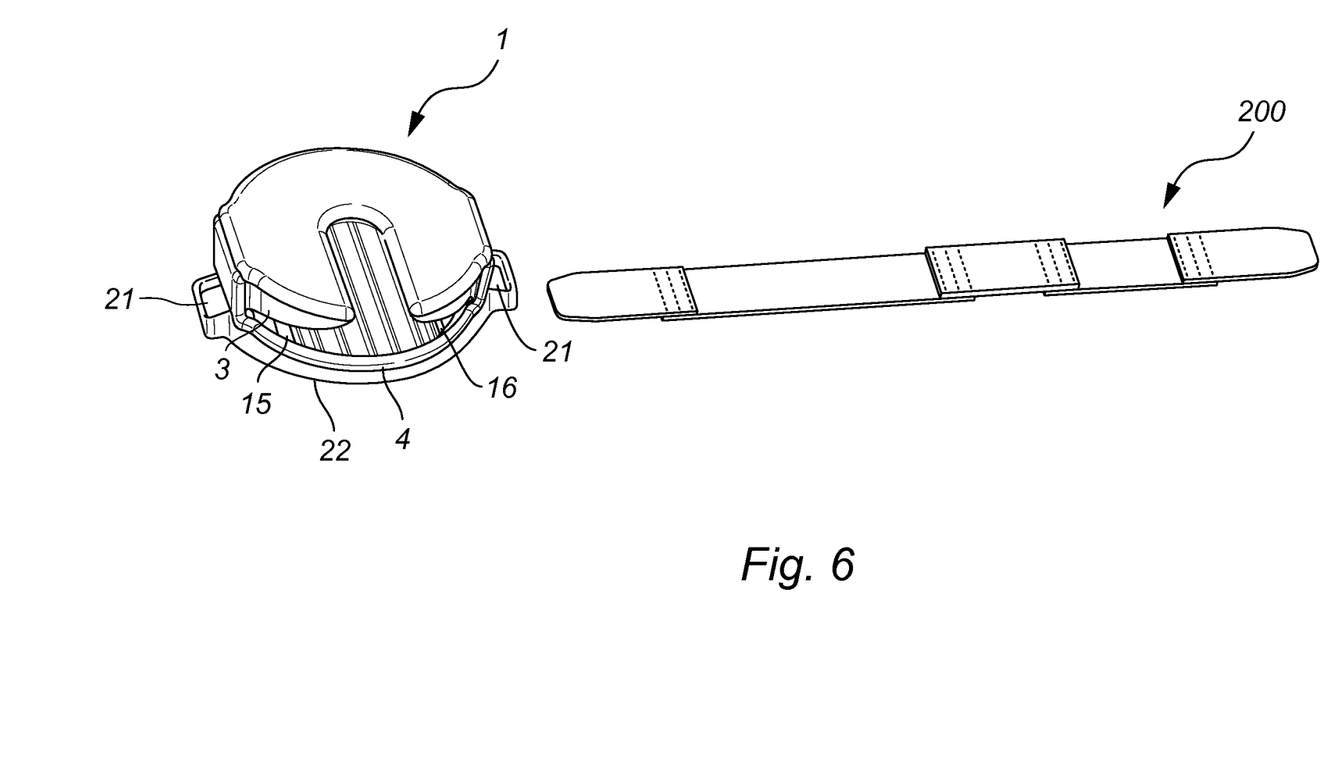
FIG. 6 illustrates a non-walled portable beverage holder assembled and strap in a downward view.

FIG. 6 illustrates a non-walled portable beverage holder 1, strap base 22, and strap 200 in downward view. As described above, the strap base 22 couples to the underside of the beverage holder 1 and includes one or more slots 21, in which a flexible strap 200 may threaded through and secured around a support structure such as a rail, post, or chair arm or frame, for example. Preferably the strap 200 can include releasable fasteners such as hook and loop (e.g., VELCRO®) or snaps, buttons, buckles, and the like to secure itself around the support structure. According to this embodiment, the bottom side of the strap base 22 will thus rest on the topside of the support structure and the strap 200, which is threaded through the one or more slots 21 is wrapped around the support structure and secured to itself using a releasable fastener, such as those discussed above.

Figure 11:
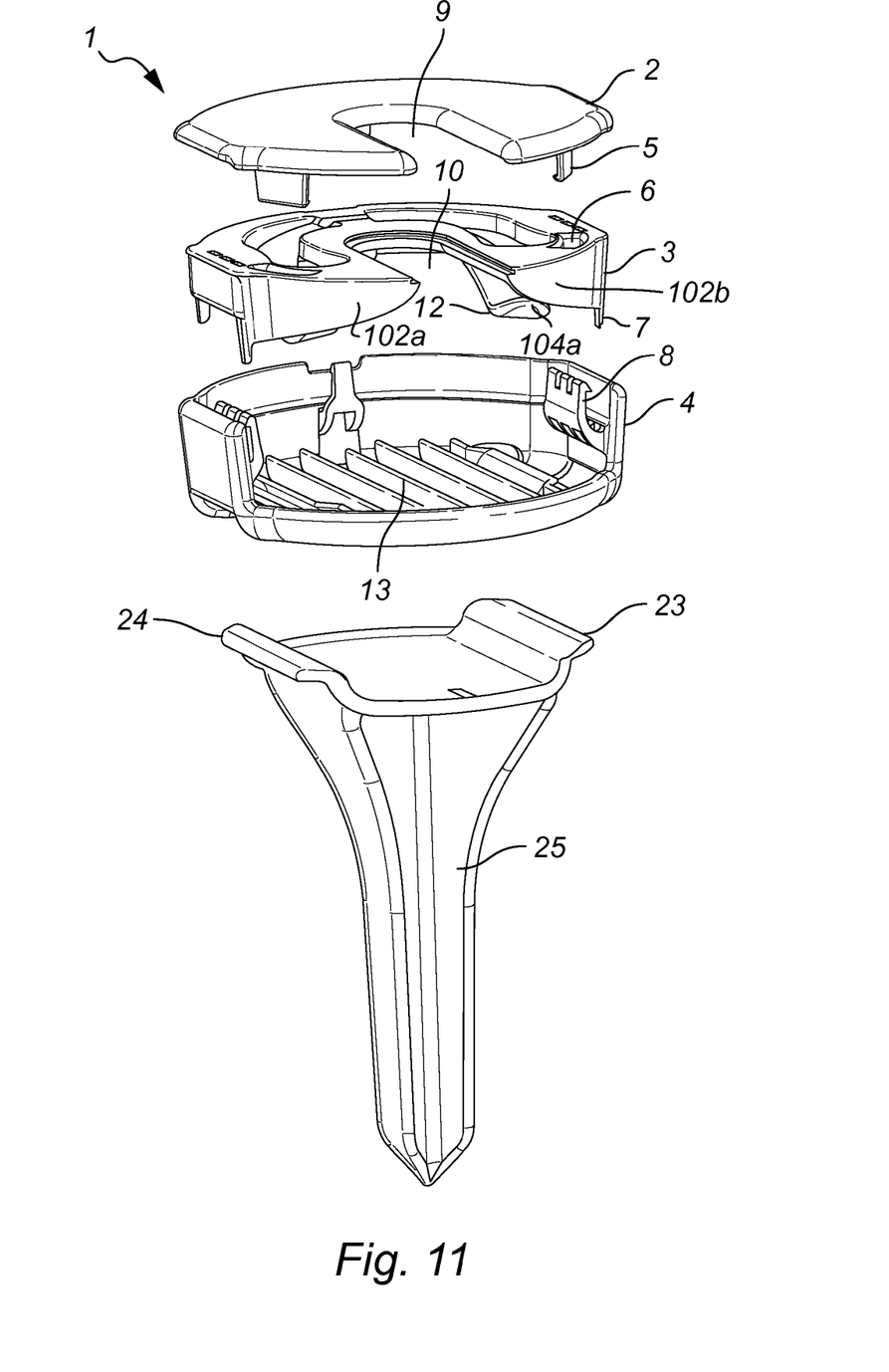
FIG. 11 illustrates a non-walled portable beverage holder and stake in an exploded view.

FIG. 11 illustrates an embodiment of the invention of a portable beverage holder 1 and bottom stake 25 in an exploded downward view. On the bottom side of the bottom piece 4 includes means for releasably attaching to a clamp, stake, or other securing or support means. According to certain embodiments, said means for releasably attaching are two parallel, recessed, grooves 15 and 16 that are configured to be releasably coupled with two complementary parallel tongues 23 and 24 that are present on the topside of a stake 25, wherein the stake 25 is configured to be plunged into the ground, such as dirt. The positioning of tongues 23 and 24 on the stake and grooves 15 and 16 on the bottom piece can be interchanged as well. The stake 25 may be of any size and shape, for example, the stake 25 may be solid or hollow, straight or tapered and having a point, and made of any suitable materials, including plastic or metal, for reversibly anchoring the beverage holder 1 into a surface such as the ground, sand or dirt. It is preferred to utilize a hollow stake for mounting the beverage holder 1 in sand, as the hollow stake can be supported internally with the sand. The walled beverage holders 1b described herein can also be used with a stake 25 as well as any suitable support or securing means.

Figure 12:
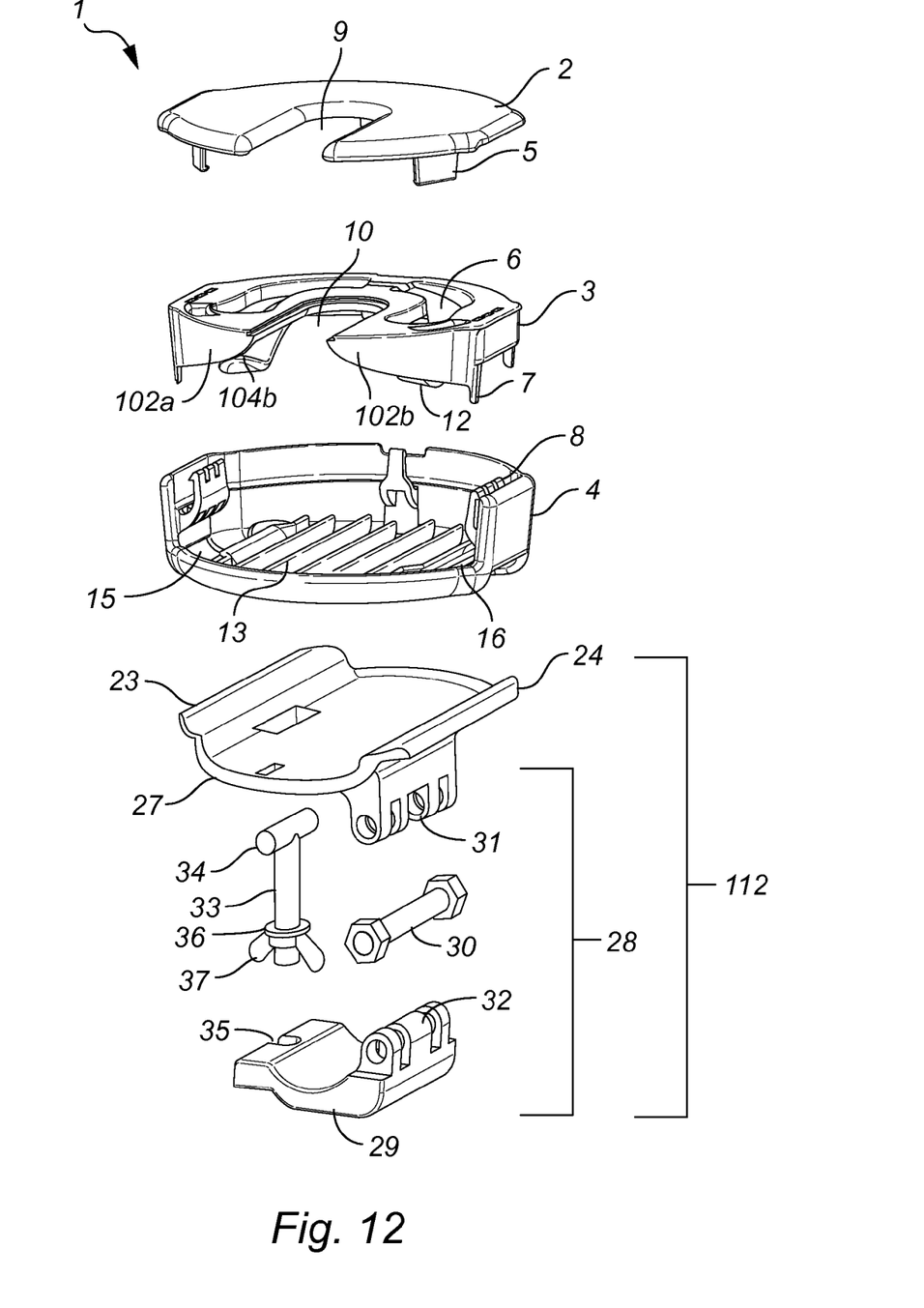
FIG. 12 illustrates a non-walled portable beverage holder and clamp in an exploded view.

FIG. 12 illustrates a non-walled portable beverage holder 1 and underside clamp 112 and in an exploded downward view. The underside clamp 112 can also be used with walled beverage holders 1a as well. As previously described, the beverage holder 1 includes a top piece 2, a middle piece 3 and a bottom piece 4. On the bottom side of the bottom piece 4 are two parallel grooves 15 and 16 that may be coupled with two parallel tongues 23 and 24 that are present on the topside of a clamp platform 27. Alternatively, the bottom piece 4 may have two parallel tongues that may be coupled with two parallel grooves on the topside of the clamp platform 27 (not shown).

Figure 13:
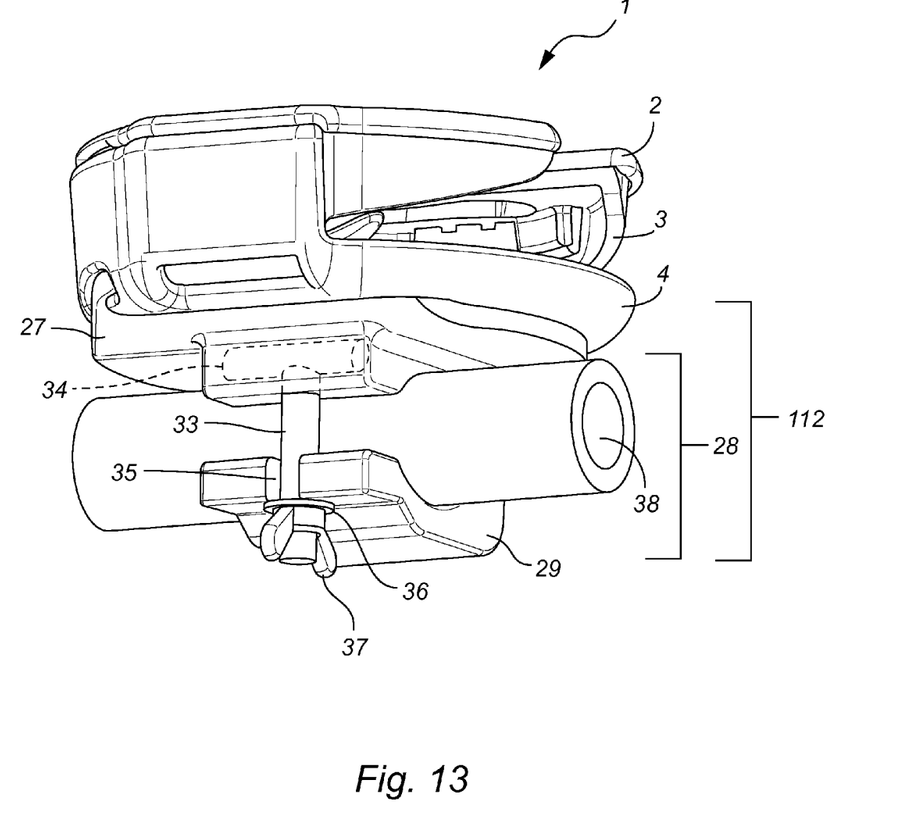
FIG. 13 illustrates a non-walled portable beverage holder and clamp in an assembled perspective view.

Any suitable clamp can be operably coupled to the underside of the beverage holders 1 and 1a described herein. FIGS. 12 and 13 show an exemplary underside clamp 112 using a hinge 28 to open and close the clamp 112. The clamp platform 27 includes a means for attaching to a support structure such as a beam or rail 38, (e.g., the top of a bar or chair frame or arm), and carries the load of the beverage holder 1 along its length. In an embodiment, the bottom side of the clamp platform 27 includes a hinge mechanism 28, which may be used to connect the clamp platform 27 to a door 29 through hinge bolt 30 and clamp platform hinge 31 and door hinge 32. The door 29 may be opened or closed and secured to the opposite side of the clamp platform 27 through bolt 33, which attaches to the opposite side of the clamp platform 27 through peg 34, and secures the door 29 through the opening in the door 35 using washer 36 and nut 37 for tightening the clamp 112 around the beam 38, and for releasing said clamp 112. The means for attaching to a support structure are preferably on the underside of the clamp platform 27 and topside of the door 29 and can include recessed areas configured to wrap around a desired shape of support structure. FIGS. 12 and 13 show semi-cylindrical recessed areas for optimal clamping onto cylindrical support structures 38, but other recessed shapes can also be used for other shapes of support structures, such as rectangular or ovular support structures. The clamp can also include resilient material, such as foam to allow for clamping to a variety of shaped structures.

Figure 14:
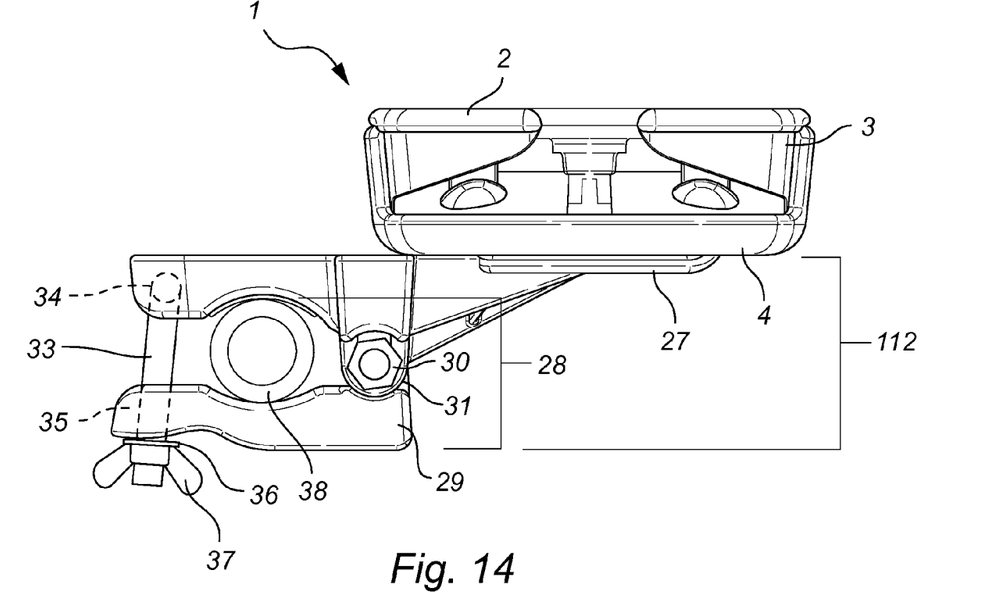
FIG. 14 illustrates a perspective view of an assembled non-walled portable beverage holder, with a cantilevered clamp.

FIG. 13 illustrates an assembled non-walled portable beverage holder 1 in a perspective view. The clamp platform 27 includes means for releasably attaching to a support structure such as a cylindrical beam 38 (e.g., rail, or chair arm or frame) which carries the load of the beverage holder 1 along its length. In this particular view, the clamp 112 is secured to the beam 38, and the clamp platform 27 carries the load of the beverage holder 1 and a full beverage container within said holder 1. While FIGS. 12 and 13 show the clamp platform 27 directly above the means for releasably attaching to a support structure, FIG. 14 depicts a clamp platform 27 that is cantilevered out from the means for releasably attaching to a support structure, instead of being positioned directly above said means. The cantilevered clamp can be used as a side mount on a lounge chair arm or frame, or other bar structures, such as round bars.

The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

What is claimed is:

1. A portable beverage holder comprising:
a middle piece operably coupled to a lower bottom piece together defining a housing, wherein the middle piece comprises a first frontal opening configured for receiving the stem of a stemmed beverage container, and wherein the bottom piece comprises a second frontal opening, positioned below from and having a larger width than the first frontal opening and configured for receiving the foot of a stemmed container, and wherein the bottom side of the middle piece comprises one or more downwardly projecting flaps configured to secure the foot of the stemmed container against the bottom piece when the foot of the stemmed beverage container is received inside the housing and further comprising a top piece having means for releasably attaching to the topside of the middle piece and comprising a third frontal opening, vertically aligned with the first frontal opening of the middle piece and configured for receiving the stem of a stemmed container.

2. The portable beverage holder of claim 1, wherein the means for releasably attaching to the topside of the middle piece comprise complementary tabs and slots.

3. The portable beverage holder of claim 1, wherein the one or more flaps are springs that can be flexed upward after the foot of a stemmed container engages said flaps when entering through the second frontal opening.

4. The portable beverage holder of claim 3, wherein the one or more flaps comprise distal tips that angle upwards.

5. The portable beverage holder of claim 1, wherein the bottom piece of the base comprises ridges and grooves to prevent slippage of the base of the stemmed container.

6. The portable beverage holder of claim 1, wherein the underside of the bottom piece is substantially level.

7. The portable beverage holder of claim 6, further comprising a support structure having a topside configured to operably couple with the underside of the bottom piece.

8. The portable beverage holder of claim 7, wherein the support structure is a stake.

9. The portable beverage holder of claim 7, wherein the support structure is a hinged clamp having means for releasably clamping onto a rail.

10. The portable beverage holder of claim 1, further comprising a strap having releasable attachment means to secure itself to a support structure, wherein the holder comprises one or more slots for the strap to thread through.

11. The portable beverage holder of claim 1, further comprising an upwardly projecting wall around the perimeter of the middle piece or substantially so, wherein the wall includes a vertical frontal opening vertically aligned with the first frontal opening and configured for receiving a stem of a stemmed container.

12. The portable beverage holder of claim 11, wherein the vertical frontal opening comprises a lower section positioned at the top of middle piece and an upper section positioned at the top of the wall, wherein the width of the lower section is narrower than the upper section.

13. The portable beverage holder of claim 12, wherein the upper section of the vertical frontal opening gradually tapers downward to the lower section of the vertical frontal opening.

14. The portable beverage holder of claim 12, wherein neither the lower section nor upper section of the vertical frontal opening is wider than 4 inches.

15. The portable beverage holder of claim 12, wherein the lower section of the vertical frontal opening is 0.5-1.25 inches wide.

16. The portable beverage holder of claim 12, wherein the wall extends upwards less than 6 inches from the topside of the middle piece.

17. The portable beverage holder of claim 1, wherein the top piece comprises an outer rim that extends upwards.

* * * * *